(12) United States Patent
Kohashi et al.

(10) Patent No.: US 10,871,094 B2
(45) Date of Patent: Dec. 22, 2020

(54) EXHAUST GAS PURIFICATION SYSTEM FOR INTERNAL COMBUSTION ENGINE

(71) Applicant: TOYOTA JIDOSHA KABUSHIKI KAISHA, Toyota (JP)

(72) Inventors: Kenichi Kohashi, Sunto-gun (JP); Hiroshi Otsuki, Gotemba (JP); Kazuki Kikuchi, Mishima (JP); Shinji Ikeda, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/354,693

(22) Filed: Mar. 15, 2019

(65) Prior Publication Data

US 2019/0292957 A1 Sep. 26, 2019

(30) Foreign Application Priority Data

Mar. 22, 2018 (JP) .................................. 2018-055161

(51) Int. Cl.
*F01N 3/00* (2006.01)
*F01N 3/028* (2006.01)
(Continued)

(52) U.S. Cl.
CPC ......... *F01N 3/028* (2013.01); *B01D 46/0063* (2013.01); *B01D 53/9495* (2013.01);
(Continued)

(58) Field of Classification Search
CPC ............ B01D 46/0063; B01D 53/9495; B01D 2279/30; F01N 11/002; F01N 3/021;
(Continued)

(56) References Cited

U.S. PATENT DOCUMENTS

2007/0022746 A1* 2/2007 Decou .................... F01N 11/00
60/295
2007/0101705 A1* 5/2007 Knitt ....................... F01N 11/00
60/295
(Continued)

FOREIGN PATENT DOCUMENTS

JP H04-171210 A 6/1992
JP 2011-252387 A 12/2011
(Continued)

*Primary Examiner* — Matthew T Largi
(74) *Attorney, Agent, or Firm* — Oliff PLC

(57) ABSTRACT

An object of the disclosure is to prevent the sensing accuracy of an exhaust gas sensor from being deteriorated by the effect of electromagnetic waves in an exhaust gas purification system for an internal combustion engine that is configured to apply electromagnetic waves to the exhaust gas purification device provided in an exhaust passage of the internal combustion engine. The disclosure is applied to an exhaust gas purification system for an internal combustion engine including an exhaust gas sensor located within the range of radiation of electromagnetic waves from a radiating device that radiates electromagnetic waves of a specific frequency to an exhaust gas purification device. The system suspends the radiation of electromagnetic waves from the radiating device during a sampling period in which sampling of the output value of the exhaust gas sensor is performed, even when a specific condition for performing the radiation is met.

5 Claims, 6 Drawing Sheets

(51) Int. Cl.
| | |
|---|---|
| *B01D 46/00* | (2006.01) |
| *B01D 53/94* | (2006.01) |
| *F01N 3/20* | (2006.01) |
| *F01N 9/00* | (2006.01) |
| *F01N 11/00* | (2006.01) |
| *H05B 6/64* | (2006.01) |
| *H05B 6/68* | (2006.01) |
| *F01N 3/021* | (2006.01) |
| *F01N 3/10* | (2006.01) |

(52) U.S. Cl.
CPC .............. *F01N 3/021* (2013.01); *F01N 3/10* (2013.01); *F01N 3/202* (2013.01); *F01N 9/002* (2013.01); *F01N 9/005* (2013.01); *F01N 11/002* (2013.01); *H05B 6/6438* (2013.01); *H05B 6/6452* (2013.01); *H05B 6/68* (2013.01); *B01D 2279/30* (2013.01); *F01N 2260/04* (2013.01); *F01N 2560/025* (2013.01); *F01N 2560/026* (2013.01); *F01N 2560/06* (2013.01); *F01N 2560/14* (2013.01); *F01N 2900/0416* (2013.01); *F01N 2900/1404* (2013.01)

(58) Field of Classification Search
CPC . F01N 3/028; F01N 3/10; F01N 3/202; F01N 9/002; F01N 9/005; F01N 2260/04; F01N 2560/025; F01N 2560/026; F01N 2560/06; F01N 2560/14; F01N 2900/0416; F01N 2900/1404; H05B 6/6438; H05B 6/6452; H05B 6/68
See application file for complete search history.

(56) References Cited

U.S. PATENT DOCUMENTS

| | | | |
|---|---|---|---|
| 2009/0217818 A1* | 9/2009 | Gonze | F01N 3/028 95/278 |
| 2010/0212299 A1* | 8/2010 | George | F01N 9/002 60/287 |
| 2010/0242441 A1* | 9/2010 | Kondo | F01N 9/002 60/277 |
| 2012/0159929 A1* | 6/2012 | Snopko | F01N 9/002 60/274 |
| 2012/0291419 A1* | 11/2012 | Snopko | F01N 9/007 60/274 |
| 2016/0363022 A1* | 12/2016 | Hoki | F01N 3/035 |
| 2017/0182447 A1* | 6/2017 | Sappok | F01N 11/00 |
| 2017/0292420 A1* | 10/2017 | Imada | F01N 3/028 |
| 2018/0087421 A1* | 3/2018 | Imada | F01N 3/028 |
| 2018/0142592 A1* | 5/2018 | Crawford | F01N 3/202 |
| 2019/0381455 A1* | 12/2019 | Ikeda | F01N 3/24 |

FOREIGN PATENT DOCUMENTS

| | | |
|---|---|---|
| JP | 2017-002785 A | 1/2017 |
| KR | 10-2016-0144917 A | 12/2016 |

\* cited by examiner

EXHAUST GAS PURIFICATION SYSTEM FOR INTERNAL COMBUSTION ENGINE

This application claims the benefit of Japanese Patent Application No. 2018-055161, filed on Mar. 22, 2018, which is hereby incorporated by reference herein in its entirety.

BACKGROUND

Technical Field

The present disclosure relates to an exhaust gas purification system for an internal combustion engine.

Description of the Related Art

It is known in the art to apply electromagnetic waves to an exhaust gas purification device provided in an exhaust passage of an internal combustion engine. For example, Patent Literature 1 in the citation list below discloses the technique of applying microwaves emitted from a microwave radiating device to an exhaust gas purification catalyst provided in an exhaust passage of an internal combustion engine to heat the exhaust gas purification catalyst. Patent Literature 2 in the citation list discloses the technique of applying microwaves to a particulate filter that is provided in an exhaust passage of an internal combustion engine to trap particulate matter in the exhaust gas. The apparatus disclosed in Patent Literature 2 is configured to apply microwaves to the upstream end face of the particulate filter. Moreover, the apparatus disclosed in Patent Literature 2 has a temperature sensor provided in the exhaust passage downstream of the particulate filter.

CITATION LIST

Patent Literature

Patent Literature 1: Japanese Patent Application Laid-Open No. 2017-02785
Patent Literature 1: Japanese Patent Application Laid-Open No. H04-171210

SUMMARY

As described above, in some arrangements, electromagnetic waves are radiated from a radiating device to an exhaust gas purification device, such as an exhaust gas purification catalyst or particulate filter, in an exhaust passage of an internal combustion engine. Moreover, an exhaust gas sensor such as a temperature sensor and/or an air-fuel ratio sensor is provided at a location relatively close to the exhaust gas purification device in the exhaust passage in some cases. If such an exhaust gas sensor is located within the range of radiation of electromagnetic waves from the radiating device in the exhaust passage, the exhaust gas sensor is also irradiated with electromagnetic waves when electromagnetic waves are radiated from the electromagnetic wave radiating device to the exhaust gas purification device. Then, the output value of the exhaust gas sensor may be affected by electromagnetic waves. In other words, there is a possibility that errors in the output value of the exhaust gas sensor may be caused by the effect of electromagnetic waves. This can lead to deterioration in the sensing accuracy of the exhaust gas sensor.

In order to prevent the influence of electromagnetic waves on the output value of the exhaust gas sensor, the exhaust gas sensor may be disposed at a location outside the range of radiation of electromagnetic waves in the exhaust passage. However, there are cases where the degree of flexibility in the location of the exhaust sensor is low depending on what is to be sensed by the exhaust gas sensor. For this reason, it is necessary in some cases to dispose the exhaust gas sensor in the range of radiation of electromagnetic waves. Moreover, in order to eliminate the influence of electromagnetic waves on the output value of the exhaust gas sensor, a shield member may be provided for the exhaust gas sensor to block electromagnetic waves. However, the shield member may hinder the contact of the exhaust gas sensor with the exhaust gas, possibly leading to deterioration in the responsivity of the exhaust gas sensor.

The present disclosure has been made in view of the above-described problem. An object of the present disclosure is to prevent, in an improved manner, the sensing accuracy of an exhaust gas sensor from being deteriorated by the effect of electromagnetic waves in an exhaust gas purification system for an internal combustion engine that is configured to apply electromagnetic waves to the exhaust gas purification device provided in an exhaust passage of the internal combustion engine.

A system according to the present disclosure may be configured to suspend radiation of electromagnetic waves to an exhaust gas purification device temporarily during a sampling period in which sampling of the output value of an exhaust gas sensor is performed.

More specifically, an exhaust gas purification system for an internal combustion engine according to the present disclosure may comprise an exhaust gas purification device provided in an exhaust passage of the internal combustion engine, a radiation device provided in the exhaust passage and configured to radiate electromagnetic waves of a specific frequency to the exhaust gas purification device, an exhaust gas sensor located within the range of radiation of electromagnetic waves from the radiating device in the exhaust passage, and a radiation control unit comprising at least one processor configured to perform radiation of microwaves from the radiating device when a specific condition for performing the radiation is met, wherein the controller suspends the radiation of electromagnetic waves from the radiating device during a sampling period in which sampling of the output value of the exhaust gas sensor is performed, even while the specific condition for performing the radiation is met.

The exhaust gas purification system according to the present disclosure includes the radiating device provided in the exhaust passage to radiate electromagnetic waves of a specific frequency to the exhaust gas purification device. The specific frequency mentioned above is determined, for example, experimentally to meet the purpose of radiation of the electromagnetic waves. The radiation control unit performs the radiation of electromagnetic waves from the radiating device when a specific condition for performing the radiation is met. This specific condition for performing the radiation is set according to the purpose of radiation of electromagnetic waves.

The exhaust gas sensor in the exhaust gas purification system according to the present disclosure is located within the range of radiation of electromagnetic waves from the radiating device (namely, located at a location which the radiated electromagnetic waves reach) in the exhaust passage. Thus, when electromagnetic waves are radiated from the radiating device, electromagnetic waves are incident also on the exhaust gas sensor. The exhaust gas sensor is a sensor that outputs an output value indicating the value of a specific parameter to be determined relating to a condition of the exhaust gas, such as the temperature of the exhaust gas or the concentration of a specific component in the exhaust gas.

In the system according to the present disclosure, the radiation control unit may suspend the radiation of electromagnetic waves from the radiating device during the sampling period in which sampling of the output value of the exhaust gas sensor is performed, even when the specific condition for performing the radiation is met. The sampling period is a period in which the value of the output of the exhaust gas sensor is acquired as a measurement value of the specific parameter to be determined by the exhaust gas sensor. In consequence, in the system according to the present disclosure, electromagnetic waves will not reach the exhaust gas sensor during the sampling period. Thus, during the sampling period, the output value of the exhaust gas sensor is prevented from being affected by electromagnetic waves. Therefore, during the sampling period, an output value of the exhaust gas sensor that is not affected by electromagnetic waves can be acquired as a measurement value measured by the exhaust gas sensor. Since it is not necessary to provide a shield member to block electromagnetic waves, the responsivity of the exhaust gas sensor is not deteriorated by such a shield member, which might interfere with the contact of the exhaust gas sensor with the exhaust gas. Therefore, deterioration in the sensing accuracy of the exhaust gas sensor by the effect of electromagnetic waves can be prevented favorably.

In the system according to the present disclosure, the radiation control unit may stop the radiation of electromagnetic waves from the radiating device before the beginning of the sampling period and restart the radiation of electromagnetic waves from the radiating device after the end of the sampling period. This additional feature makes the period through which the radiation of electromagnetic waves from the radiating device is suspended longer than the sampling period. Then, even if there are variations in the time of stopping or restarting the radiation of microwaves due to variations in control of the radiation device or other reasons, it is possible to prevent the incidence of microwaves on the exhaust gas sensor during the sampling period with increased probability.

In some cases, sampling of the output value of the exhaust gas sensor is performed repeatedly at a predetermined sampling cycle in the exhaust gas purification system for an internal combustion engine. In such cases, if the radiation of electromagnetic waves from the radiating device is suspended during every sampling period, the radiation of electromagnetic waves will be stopped repeatedly. Then, there may occur a delay in the time of achievement of the purpose of radiation of electromagnetic waves to the exhaust gas purification device.

To solve the above problem, in cases where sampling of the output value of the exhaust gas sensor is performed repeatedly at a predetermined sampling cycle in the system according to the present disclosure, the predetermined sampling cycle may be set longer when the specific condition for performing the radiation is met than when the specific condition for performing the radiation is not met, while the duration of the sampling period is kept the same. This additional feature makes the interval between one sampling period and the next sampling period longer when the radiation of electromagnetic waves from the radiating device is being performed than when the radiation of electromagnetic waves is not being performed. Then, the frequency of stopping the radiation of electromagnetic waves from the radiating device can be made lower than that in the case where the sampling cycle that is set when the specific condition for performing the radiation is equal to the sampling cycle that is set when the specific condition for performing the radiation is not met. This can prevent or reduce a delay in the time of achievement of the purpose of radiation of electromagnetic waves to the exhaust gas purification device.

In cases where sampling of the output value of the exhaust gas sensor is performed repeatedly at a predetermined sampling cycle in the system according to the present disclosure when the condition for performing the radiation is met, the radiation control unit may suspend the radiation of electromagnetic waves from the radiating device during one sampling period among a predetermined number of sampling periods. This additional feature can make the frequency of stopping the radiation of electromagnetic waves from the radiating device lower than that in the case where the radiation of electromagnetic waves from the radiating device is suspended during every sampling cycle. This can prevent or reduce a delay in the time of achievement of the purpose of radiation of electromagnetic waves to the exhaust gas purification device. Moreover, the output value of the exhaust gas sensor can be prevented from being affected by electromagnetic waves during one sampling period, among the predetermined number of sampling periods, in which the radiation of electromagnetic waves from the radiating device is suspended. In other words, when the predetermined number of times of sampling of the output value of the exhaust gas sensor is performed while the radiation of electromagnetic waves from the radiating device is being performed, an output value of the exhaust gas sensor that is not affected by electromagnetic waves can be acquired as the measurement value measured by the exhaust gas sensor during one of the sampling periods.

The exhaust gas sensor in the exhaust gas purification system according to the present disclosure may be a temperature sensor that measures the temperature of exhaust gas flowing into the exhaust gas purification device (which will also be referred to as "inflowing exhaust gas") or the exhaust gas flowing out of the exhaust gas purification device (which will also be referred to as "outflowing exhaust gas"). It is necessary for the temperature sensor for measuring the temperature of the inflowing exhaust gas or the outflowing exhaust gas to be disposed at a location in the exhaust passage close to the exhaust gas purification device. For this reason, the temperature sensor is inevitably located within the range of radiation of electromagnetic waves. The present disclosure can preferably prevent the accuracy of measurement by the temperature sensor from being deteriorated by the effect of electromagnetic waves even in the case where the temperature sensor is located within the range of radiation of electromagnetic waves.

The present disclosure can prevent, in an improved manner, the sensing accuracy of an exhaust gas sensor from being deteriorated by the effect of electromagnetic waves in an exhaust gas purification system for an internal combustion engine that is configured to apply electromagnetic waves to the exhaust gas purification device provided in an exhaust passage of the internal combustion engine.

DESCRIPTION OF THE EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless stated otherwise.

EMBODIMENT (General Configuration)

Figure 1:
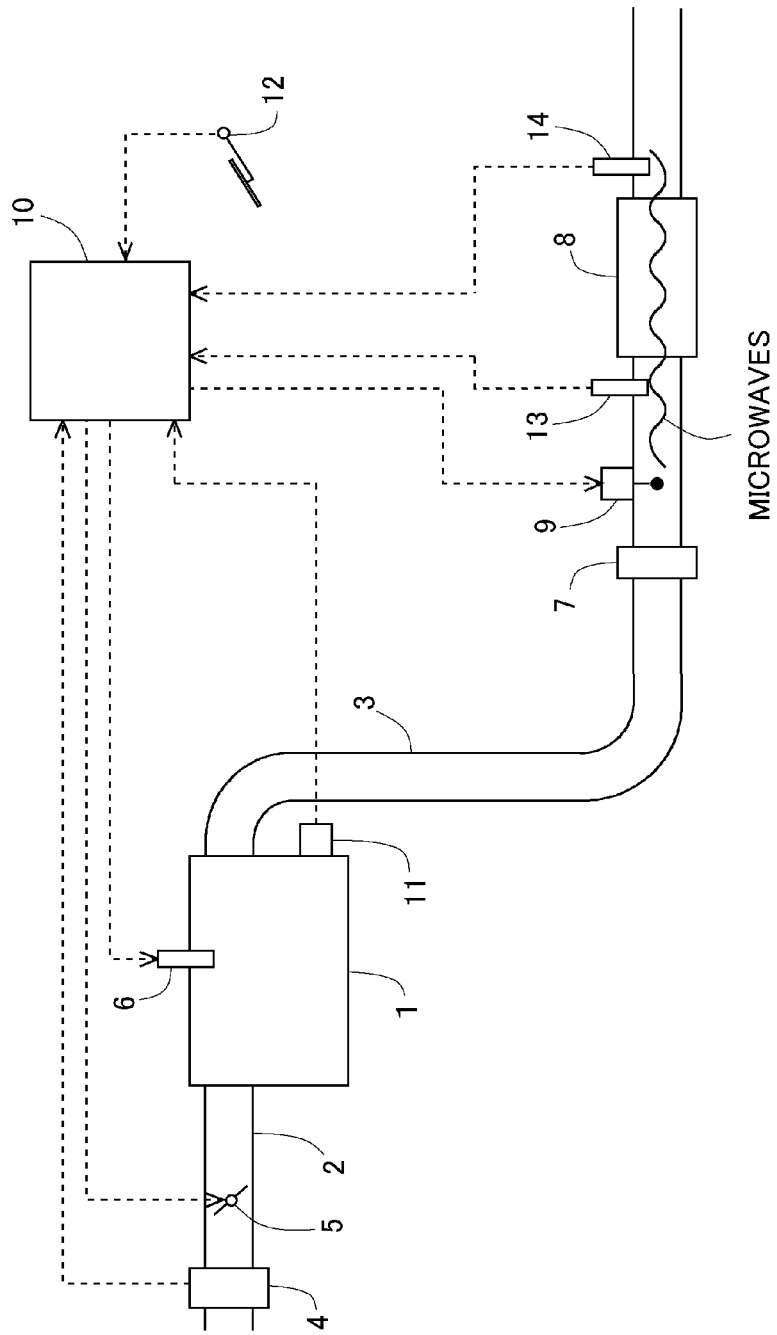
FIG. 1 is a diagram illustrating the general configuration of an air-intake system and an exhaust system of an internal combustion engine according to an embodiment.

FIG. 1 is a diagram illustrating the general configuration of an air-intake system and an exhaust system of an internal combustion engine according to an embodiment. The internal combustion engine 1 according to this embodiment is a diesel engine used to drive a vehicle. However, internal combustion engines to which the present disclosure is to be applied are not limited to diesel engines, but the present disclosure may be applied to gasoline engines. Each cylinder of the internal combustion engine 1 is provided with a fuel injection valve 6. The internal combustion engine 1 is connected with an intake passage 2 and an exhaust passage 3. The intake passage 2 is provided with an air flow meter 4 and a throttle valve 5. The air flow meter 4 measures the flow rate of the intake air (i.e. the intake air quantity of the internal combustion engine 1). The throttle valve is capable of varying the cross sectional area of the intake air channel to control the intake air quantity of the internal combustion engine 1.

The exhaust passage 3 is provided with an oxidation catalyst 7 and a particulate filter 8, which will be simply referred to as the filter 8 hereinafter. The filter 8 is arranged downstream of the oxidation catalyst 7 in the exhaust passage 3. The filter 8 is a wall-flow filter that traps particulate matter (PM) in the exhaust gas. The exhaust passage 3 is also provided with a first temperature sensor 13, which is located downstream of the oxidation catalyst 7 and upstream of the filter 8, and a second temperature sensor 14, which is located downstream of the filter 8. The first temperature sensor 13 measures the temperature of the exhaust gas flowing into the filter 8 (which will be referred to as the "inflowing exhaust gas"), and the second temperature sensor 14 measures the temperature of the exhaust gas flowing out of the filter 8 (which will be referred to as the "outflowing exhaust gas"). In other words, the parameter to be measured by the first temperature sensor 13 is the temperature of the inflowing exhaust gas, and the parameter to be measured by the second temperature sensor 14 is the temperature of the outflowing exhaust gas. For this purpose, the first temperature sensor 13 and the second temperature sensor 14 are disposed at locations near the filter 8.

The exhaust passage 3 is further provided with a radiating device 9, which is located downstream of the oxidation catalyst 7 and upstream of the first temperature sensor 13. The radiating device 9 is a device that radiates or emits microwaves (electromagnetic waves) to be applied to the filter 8. The radiating device 9 includes a microwave generator and a microwave emitter, neither of which is illustrated in the drawings. As the microwave generator, a semiconductor generator may be used. The radiating device 9 emits microwaves generated by the microwave generator toward the filter 8 through the microwave emitter.

The first temperature sensor 13 is arranged between the radiating device 9 and the filter 8 in the exhaust passage 3. The second temperature sensor 14 is located downstream of and in the vicinity of the filter 8 in the exhaust passage 3. Thus, the locations of the first temperature sensor 13 and the second temperature sensor 14 are in the range of microwave radiation by the radiating device 9 in the exhaust passage 3. In consequence, when microwaves are radiated from the radiating device 9 to the filter 8, the microwaves also reach the first temperature sensor 13 and the second temperature sensor 14.

In this embodiment, the filter 8 corresponds to the "exhaust gas purification device" according to the present disclosure. However, the exhaust gas purification device according to the present disclosure is not limited to a particulate filter, but it may be an exhaust gas purification catalyst, such as an oxidation catalyst, a three-way catalyst, an NOx storage reduction catalyst, or a selective catalytic reduction NOx catalyst. The exhaust gas purification device according to the present disclosure may be a composite of a particulate filter and an exhaust gas purification catalyst. The radiating device 9 in this embodiment corresponds to the "radiating device" according to the present disclosure.

In this embodiment, the first temperature senor 13 and/or the second temperature sensor 14 corresponds to the "exhaust gas sensor" according to the present disclosure. However, the exhaust gas sensor according to the present disclosure is not limited to a temperature sensor, but it may be a sensor that measures the value of a parameter relating to a condition of the exhaust gas other than the temperature. An example of such a parameter is the concentration of a certain component in the exhaust gas. Specifically, the exhaust gas sensor may be an $O_2$ sensor, an NOx sensor, or an air-fuel ratio sensor etc.

An electronic control unit (ECU) 10 is provided for the internal combustion engine 1. The ECU 10 controls the operating state of the internal combustion engine 1. The ECU 10 is electrically connected with the air flow meter 4, the first temperature sensor 13, and the second temperature sensor 14. The ECU 10 is also electrically connected with a crank position sensor 11 and an accelerator opening degree sensor 12. The measurement values of these sensors are input to the ECU 10. The ECU 10 calculates the engine speed of the internal combustion engine 1 on the basis of the measurement value of the crank position sensor 11. Moreover, the ECU 10 calculates the engine load of the internal combustion engine 1 on the basis of the measurement value of the accelerator opening degree sensor 12.

In this embodiment, the ECU 10 performs sampling of the output values of the first temperature sensor 13 and the second temperature sensor 14 repeatedly at a predetermined sampling cycle while the internal combustion engine 1 is running. Thus, sampling periods recur at a predetermined sampling cycle, in which the ECU 10 acquires the output values of the first temperature sensor 13 and the second temperature sensor 14 as measured values as to the inflowing exhaust gas and the outflowing exhaust gas respectively. The ECU 10 estimates the temperature of the filter 8 on the basis of the temperature of the inflowing exhaust gas and the temperature of the outflowing exhaust gas acquired during the sampling periods. The duration of each sampling period is predetermined (e.g. 10 msec)

The ECU 10 is electrically connected with the throttle valve 5, the fuel injection valve 6, and the radiating device 9. These components are controlled by the ECU 10. For example, when heating of the filter 8 is required, the ECU 10 causes the radiating device 9 to radiate microwaves of a specific frequency to the filter 8. This specific frequency is determined for example experimentally as a frequency preferable for heating the filter 8.

(Radiation of Microwaves)

As the filter 8 traps particulate matter (PM), the trapped PM is gradually deposited in the filter 8. While the internal combustion engine 1 is running, the ECU 10 estimates the quantity of PM trapped by the filter 8 and the quantity of PM oxidized in the filter 8 and calculates the PM deposition amount in the filter 8 (namely, the amount of PM deposited in the filter 8) by integrating the aforementioned estimated quantities at any time. When the PM deposition amount in the filter 8 reaches a predetermined threshold for starting regeneration, a filter regeneration process is performed, which is the process of oxidizing the PM deposited in the filter 8 by purposely raising the temperature of the filter 8 to a temperature at which PM can be oxidized (which will be referred to as the "PM oxidation temperature"). In this embodiment, this filter regeneration process is performed by radiation of microwaves from the radiating device 9.

Specifically, when the PM deposition amount in the filter 8 reaches the predetermined threshold for starting regeneration, the ECU 10 starts the radiation of microwaves of a specific frequency from the radiating device 9 to the filter 8. Consequently, the filter 8 is heated, and the temperature of the filter 8 rises to the specific PM oxidation temperature. Then, the ECU 10 controls the radiation of microwaves from the radiating device 9 so as to keep the temperature of the filter 8 equal to or higher than and close to the specific PM oxidation temperature. More specifically, when the temperature of the filter 8 reaches or exceeds the specific PM oxidation temperature, the ECU 10 causes the radiating device 9 to stop the radiation of microwaves. When afterward the temperature of the filter 8 becomes lower than the specific PM oxidation temperature, the ECU 10 causes the radiating device 9 to restart the radiation of microwaves. As above, in this embodiment, if the condition for performing the filter regeneration process is met and the temperature of the filter 8 is lower than the specific PM oxidation temperature, the ECU 10 determines that heating of the filter 8 is required and activates the radiation of microwaves to the filter 8 by the radiating device 9.

As described above, the first temperature sensor 13 and the second temperature sensor 14 are located within the range of radiation from the radiating device 9 in the arrangement according to the embodiment. In consequence, when microwaves of the specific frequency are radiated from the radiating device 9 to the filter 8, the microwaves are incident on the first temperature sensor 13 and the second temperature sensor 14 also. The microwaves incident on the first temperature sensor 13 and the second temperature sensor 14 can cause errors in the output values of the first temperature sensor 13 and/or the second temperature sensor 14. If output values containing errors are sampled as measurement values of these sensors 13, 14, the accuracy of measurement of the temperatures of the inflowing exhaust gas and/or the outflowing exhaust gas by these sensors will be deteriorated. Then, the accuracy of estimation of the temperature of the filter 8 by the ECU 10 will also be deteriorated.

Figure 2:
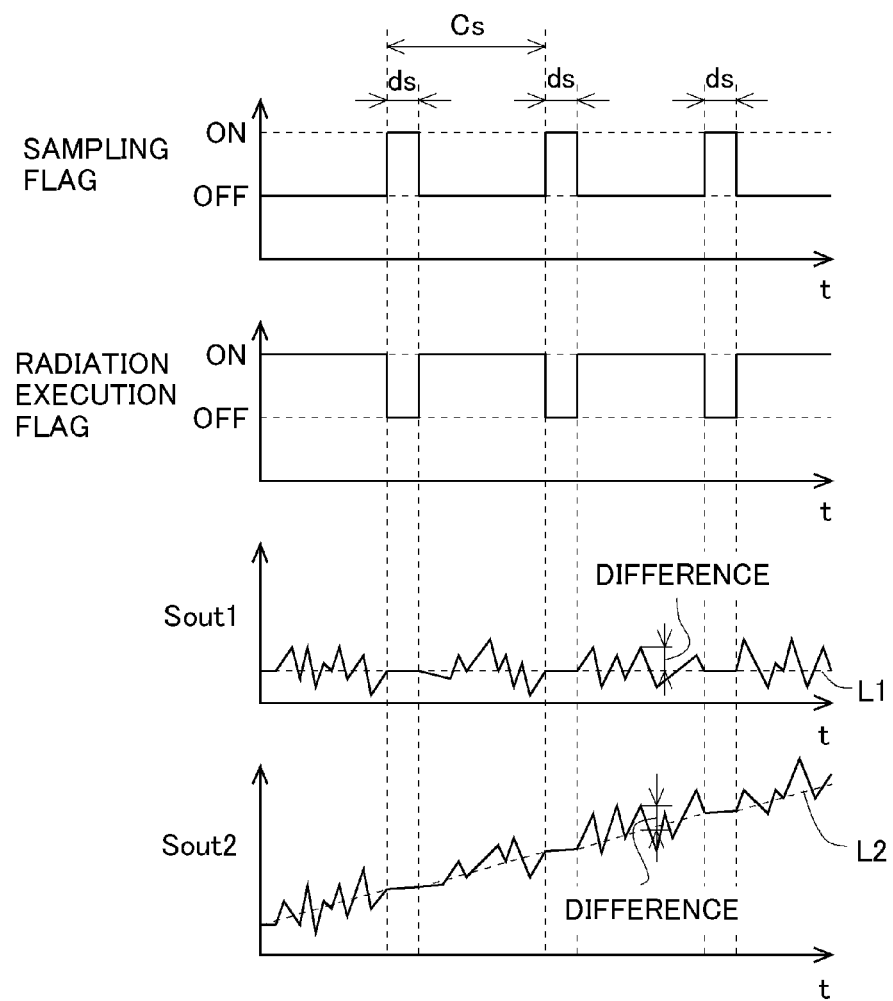
FIG. 2 is a time chart illustrating changes with time of a sampling flag, a radiation execution flag, the output value Sout1 of a first temperature sensor, and the output value Sout2 of a second temperature sensor in a case where a specific condition for performing the radiation of microwaves from a radiating device to a filter is met in a system according to the embodiment.

In this embodiment, in order to prevent deterioration in the accuracy of measurement of the inflowing exhaust gas temperature and the outflowing exhaust gas temperature by the first temperature sensor 13 and the second temperature sensor 14, the radiation of microwaves from the radiating device 9 to the filter 8 is suspended during the sampling periods in which sampling of the output values of the first temperature sensor 13 and the second temperature sensor 14 is performed. FIG. 2 is a time chart illustrating changes with time of a sampling flag, a radiation execution flag, the output value of the first temperature sensor, and the output value of the second temperature sensor in a case where a specific condition for performing the radiation of microwaves from the radiating device to the filter is met in the system according to the embodiment. The specific condition for performing the radiation of microwaves in this embodiment is that the condition for performing the filter regeneration process is met and the temperature of the filter 8 is lower than the specific PM oxidation temperature. The horizontal axis in FIG. 2 represents time t.

The sampling flag in FIG. 2 is a flag that is set to ON when the ECU 10 is to perform sampling of the output values of the first temperature sensor 13 and the second temperature sensor 14. Therefore, in FIG. 2, the periods ds during which the sampling flag is ON indicate sampling periods. In FIG. 2, the cycle Cs from the beginning of one sampling period ds to the beginning of the next sampling period ds is the predetermined sampling cycle in this embodiment.

The radiation execution flag in FIG. 2 is a flag that is set to ON when the radiation of microwaves of the specific frequency from the radiating device 9 is to be performed. Therefore, during the periods in which the radiation execution flag is ON, the radiation of microwaves from the radiating device 9 is being performed. On the other hand, during the periods in which the radiation execution flag is OFF, the radiation of microwaves from the radiating device 9 is being suspended. In FIG. 2, Sout1 represents the output value of the first temperature sensor 13, and Sout2 represents the output value of the second temperature sensor 14. Broken line L1 in FIG. 2 represents the actual temperature of the inflowing exhaust gas to be measured by the first temperature sensor 13. The actual temperature of the inflowing exhaust gas remains substantially constant with the lapse of time. Broken line L2 in FIG. 2 represents the actual temperature of the outflowing exhaust gas to be measured by the second temperature sensor 14. As microwaves of the specific frequency is radiated from the radiating device 9 to the filter 8, the temperature of the filter 8 rises. The actual temperature (L2) of the outflowing exhaust gas rises gradually with rises in the temperature of the filter 8.

As will be seen in FIG. 2, during the periods in which the radiation execution flag is ON, the output value Sout1 of the first temperature sensor 13 fluctuates, and accordingly there are differences between the output value Sout1 and the actual temperature of the inflowing exhaust gas. Moreover, during the periods in which the radiation execution flag is ON, the output value Sout2 of the second temperature sensor 14 fluctuates, and accordingly there are differences between the output value Sout2 and the actual temperature of the outflowing exhaust gas also. The fluctuations of the output values of the first temperature sensor 13 and the second temperature sensor 14 are caused by the incidence of microwaves radiated from the radiating device 9 on the sensors 13, 14.

In this embodiment, even when the specific condition for performing the radiation is met, the radiation execution flag is set to OFF during the sampling periods ds. This means that the radiation of microwaves from the radiating device 9 is suspended during the sampling periods ds. In consequence, microwaves are not incident on the first temperature sensor 13 or the second temperature sensor 14 during the sampling periods ds. Therefore, the output values of the first temperature sensor 13 and the second temperature sensor 14 are prevented from being affected by microwaves during the sampling periods ds. Thus, fluctuations of the output values of the first temperature sensor 13 and the second temperature sensor 14 like those occurring during the radiation of microwaves from the radiating device 9 are prevented from occurring during the sampling periods ds. Therefore, as will be seen in FIG. 2, during the sampling periods ds, the output value of the first temperature sensor 13 indicates the actual temperature (L1) of the inflowing exhaust gas, and the output value of the second temperature sensor 14 indicates the actual temperature (L2) of the outflowing exhaust gas.

As above, the radiation of microwaves from the radiating device 9 is suspended during the sampling periods. In consequence, it is possible to acquire output values of the first temperature sensor 13 and the second temperature sensor 14 that are not affected by microwaves, namely output values corresponding to the actual temperatures of the inflowing exhaust gas and the outflowing exhaust gas, as measurement values measured by the respective sensors 13, 14. Thus, the accuracy of measurement of the inflowing exhaust gas temperature by the first temperature sensor 13 and the accuracy of measurement of the outflowing exhaust gas temperature by the second temperature sensor 14 are prevented from being deteriorated. Therefore, the ECU 10 can estimate the temperature of the filter 8 on the basis of the inflowing exhaust gas temperature and the outflowing exhaust gas temperature that are measured with high accuracy. This can prevent deterioration in the accuracy of estimation of the temperature of the filter 8 by the ECU 10.

The above-described process can eliminate influences of microwaves on the output values of the first temperature sensor 13 and the second temperature sensor 14 without need to provide a shield member for blocking microwaves for these sensors. Therefore, the responsivity of the first temperature sensor 13 and the second temperature sensor 14 is not deteriorated by such a shield member, which might interfere with the contact of these sensors with the exhaust gas.

(Process of Controlling Microwave Radiation)

Figure 3:
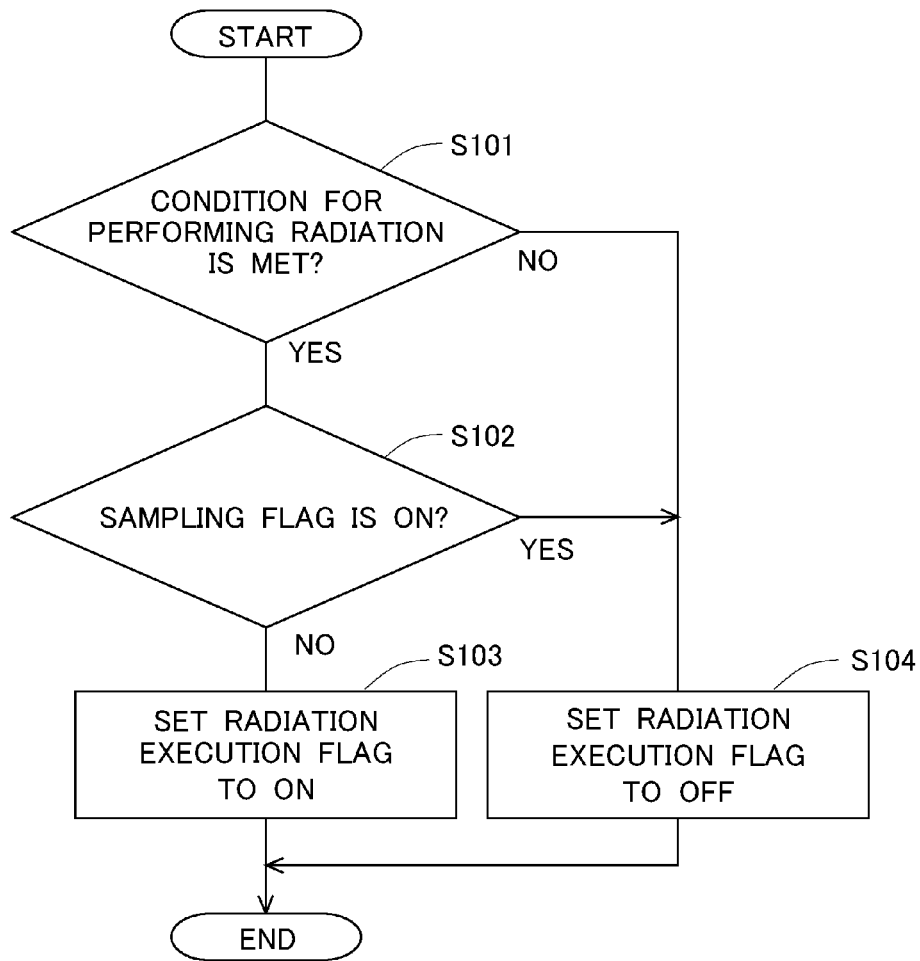
FIG. 3 is a flow chart of a process of controlling radiation of microwaves from the radiating device to the filter according to the embodiment.

FIG. 3 is a flow chart of a process of controlling the radiation of microwaves from the radiating device to the filter. This process is implemented by a program stored in the ECU 10 in advance, which is executed by the ECU 10 repeatedly at predetermined intervals while the internal combustion engine 1 is running.

In this process, firstly in step S101, it is determined whether or not the specific condition for performing the radiation is met. As described above, the specific condition for performing the radiation is that the condition for performing the filter regeneration process is met and the temperature of the filter 8 is lower than the specific PM oxidation temperature.

The ECU 10 repeatedly executes another process different from the process described here to calculate the PM deposition amount in the filter 8 at any time. When the PM deposition amount in the filter 8 reaches a predetermined threshold for starting regeneration, it is determined that the condition for performing the filter regeneration process is met. When the PM deposition amount in the filter 8 decreases to a predetermined threshold indicating the completion of regeneration after the start of the filter regeneration process, it is determined that the condition for performing the filter regeneration fails. Thus, the period through which the condition for performing the filter regeneration process is met continues from the time when the PM deposition amount in the filter 8 reaches the predetermined threshold for starting regeneration to the time when the PM deposition amount decreases to the predetermined threshold indicating the completion of regeneration. The temperature of the filter 8 is estimated by the ECU 10 at any time on the basis of the measured value of the inflowing exhaust gas temperature (i.e. the output value of the first temperature sensor 13) and the measured value of the outflowing exhaust gas (i.e. the output value of the second temperature sensor 14), which are acquired at a predetermined sampling cycle.

If an affirmative determination is made in step S101, then in step S102 it is determined whether or not the sampling flag is ON. If a negative determination is made in step S102, in other words if it is not during a sampling period now, then in step S103 the radiation execution flag is set to ON. Consequently, the radiation of microwaves of the specific frequency from the radiating device 9 is performed. In a negative determination was made in step S102 in the last execution of this process, the radiation of microwaves of the specific frequency from the radiating device 9, which has already been performed, is continued.

If a negative determination is made in step S101, then in step S104 the radiation execution flag is set to OFF. Consequently, the radiation of microwaves from the radiating device 9 is suspended. If an affirmative determination is made in step S102, namely if it is during a sampling period now while the specific condition for performing the radiation is met, then in step S104 the radiation execution flag is set to OFF. Consequently, the radiation of microwaves from the radiating device 9 is suspended. If a negative determination was made in step S101 or an affirmative determination was made in step S102 in the last execution of this process, the radiation of microwaves from the radiating device 9, which has already been suspended, is continued to be suspended.

In the above process, even when the specific condition for performing the radiation is met, the radiation of microwaves from the radiating device 9 is suspended during the sampling periods.

First Modification

Figure 4:
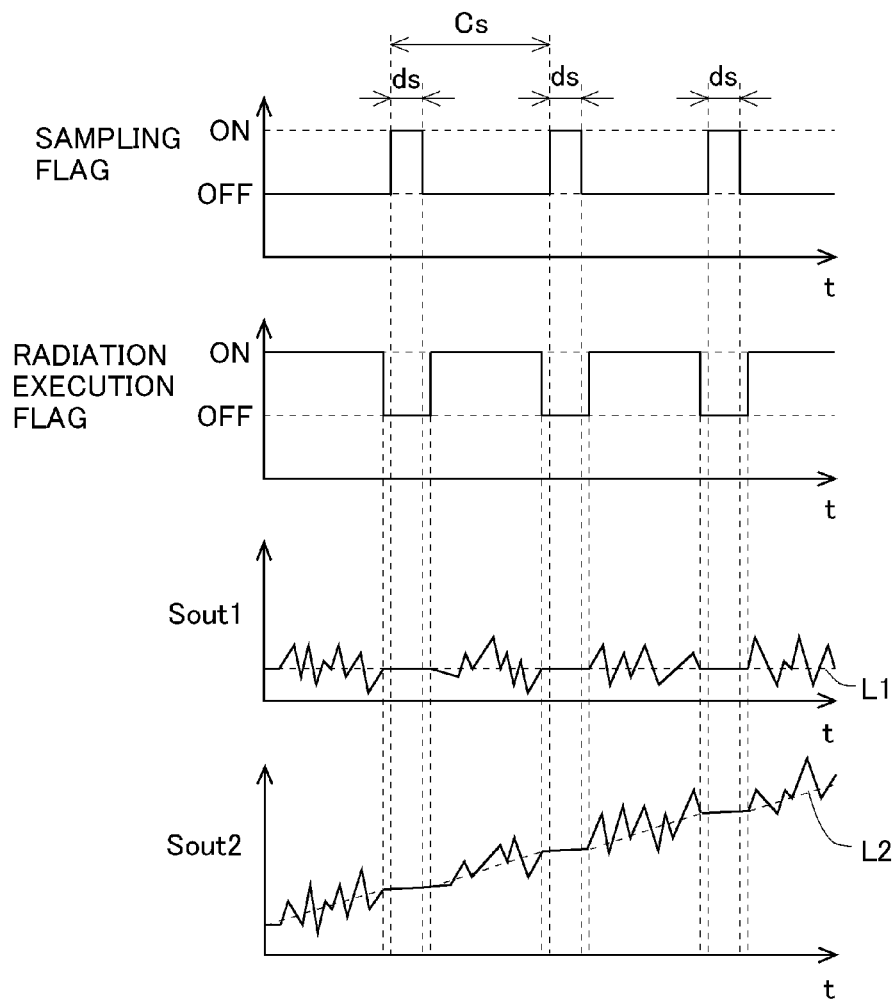
FIG. 4 is a time chart illustrating changes with time of the sampling flag, the radiation execution flag, the output value Sout1 of the first temperature sensor, and the output value Sout2 of the second temperature sensor in a case where the specific condition for performing the radiation is met in a system according to a first modification.

A modification of the control of the radiation of microwaves from the radiating device to the filter according to the embodiment will be described. FIG. 4 is a time chart illustrating changes with time of the sampling flag, the radiation execution flag, the output value Sout1 of the first temperature sensor, and the output value Sout2 of the second temperature sensor in a case where the specific condition for performing the radiation is met in the process according to the first modification.

In the process of controlling the radiation of microwaves according to this modification also, the radiation of microwaves from the radiating device 9 is suspended during the sampling periods ds. In the process according to this modification, the radiation execution flag is changed from ON to OFF before the sampling flag is changed from OFF to ON in each sampling period ds, as illustrated in FIG. 4. Moreover, the radiation execution flag is changed from OFF to On after the sampling flag is changed from ON to OFF in each sampling period ds.

Thus, the radiation of microwaves from the radiating device is stopped before the beginning of the sampling period Ds and restarted after the end of the sampling period Ds. In other words, the period through which the radiation of microwaves from the radiating device 9 is suspended is longer than the sampling period ds.

As described above, when the radiation execution flag changes from ON to OFF while the radiation of microwaves from the radiating device 9 is being performed, the radiation of microwaves from the radiating device 9 is stopped. When the radiation execution flag changes from OFF to ON while the radiation of microwaves from the radiating device 9 is being suspended, the radiation of microwaves from the radiating device 9 is restarted. There may be variations in the time of stopping or restarting the radiation of microwaves due to variations in control of the radiation device 9 or other reasons. In the case where the timing of switching between ON and OFF of the radiation execution flag is determined in advance in such a way as to make the length of the period of suspension of the microwave radiation from the radiating device 9 equal to the sampling period ds as illustrated in FIG. 2, there is a possibility that microwaves are radiated from the radiating device 9 during the sampling period ds, if there are variations in the time of stopping or restarting the radiation of microwaves. In other words, there is a possibility that the radiation of microwaves from the radiating device 9 may continue even after the beginning of the sampling period ds or the radiation of microwaves from the radiating device 9 may restart before the end of the sampling period ds.

To solve the above problem, in the process according to this modification, the timing of switching between ON and OFF of the radiation execution flag is set in advance in such a way as to make the period of suspension of the microwave radiation from the radiating device 9 longer than the sampling period ds, as illustrated in FIG. 4. This process can prevent microwaves from being radiated during the sampling periods ds even if there are variations in the time of stopping or restarting the radiation of microwaves due to variations in control of the radiating device 9 or other reasons. Therefore, it is possible to prevent the incidence of microwaves on the first temperature sensor 13 and the second temperature sensor 14 during the sampling periods ds with increased probability.

In the process of this modification, the interval between the time when the sampling flag is changed from OFF to ON and the time when the radiation execution flag is changed from ON to OFF and the interval between the time when the sampling flag is changed from ON to OFF and the time when the radiation execution flag is changed from OFF to ON are determined in advance. Therefore, in the case of this modification also, the radiation of microwaves from the radiating device 9 can be suspended at a cycle correspond to the predetermined sampling cycle.

Second Modification

Figure 5:
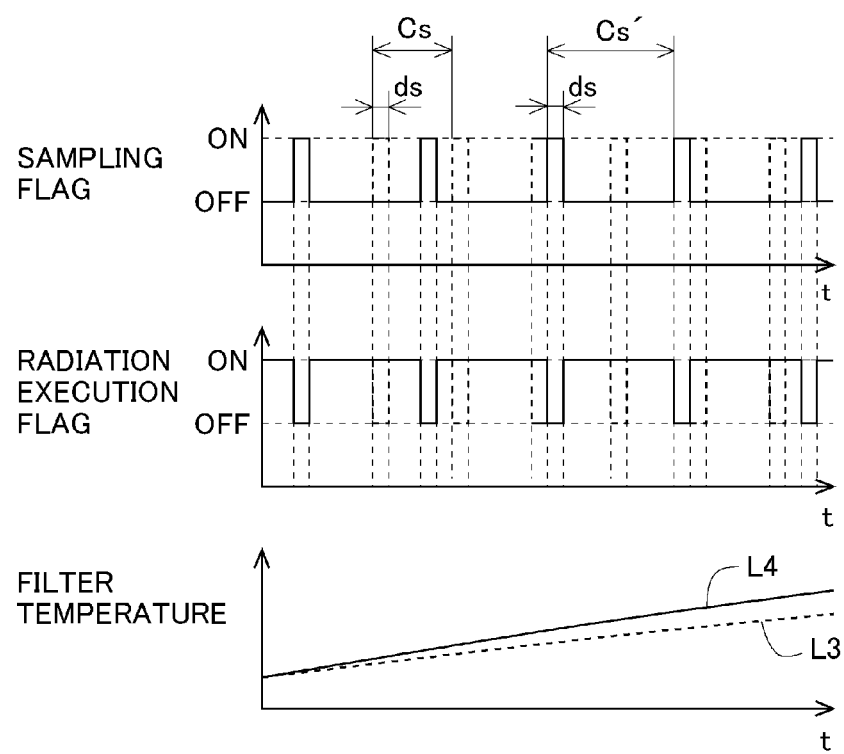
FIG. 5 is a time chart illustrating changes with time of the sampling flag, the radiation execution flag, and the temperature of the filter in a case where the specific condition for performing the radiation is met in a system according to a second modification.

FIG. 5 is a time chart illustrating changes with time of the sampling flag, the radiation execution flag, and the temperature of the filter 8 (filter temperature) in a case where the specific condition for performing the radiation is met in the process according to a second modification. In the process of controlling the radiation of microwaves according to this modification also, the radiation of microwaves from the radiating device 9 is suspended during the sampling periods ds. What is different in the process according to the second modification from the above-described embodiment is that the predetermined sampling cycle is set longer when the specific condition for performing the radiation is met than when it is not met, while the duration of each sampling period ds is kept the same.

In the graphs of the sampling flag and the radiation execution flag in FIG. 5, the broken lines represent changes of these flags in the case where the predetermined sampling cycle Cs is set equal to that during the time when the specific condition for performing the radiation is not met. In the graphs of the sampling flag and the radiation execution flag in FIG. 5, the solid lines represent changes of these flags in the case where the predetermined sampling cycle Cs' is set longer than that during the time when the specific condition for performing the radiation is not met. In the graph of the filter temperature in FIG. 5, the broken line L3 represents changes in the filter temperature in the case where the predetermined sampling cycle Cs is set equal to that during the time when the specific condition for performing the radiation is not met. In the graph of the filter temperature in FIG. 5, the solid line L4 represents changes in the filter temperature in the case where the predetermined sampling cycle Cs' is set longer than that during the time when the specific condition for performing the radiation is not met.

If the radiation of microwaves from the radiating device 9 is suspended during every sampling period ds, the radiation of microwaves is stopped repeatedly. If the frequency of stopping the radiation of microwaves is too high, the rate of rise in the temperature of the filter 8 may become low. If the rate of rise in the temperature of the filter 8 becomes low, a delay in the time when the temperature of the filter 8 reaches the specific PM oxidation temperature will occur.

To solve the above problem, in the process according to the second modification as illustrated in FIG. 5, the predetermined sampling cycle is set longer when the specific condition for performing the radiation is met than when it is not met, while the duration of the sampling period ds is kept the same. In consequence, the interval between one sampling period and the next sampling period is longer when the radiation of microwaves from the radiating device 9 is being performed than when the radiation of microwaves is not being performed. Accordingly, the interval between one radiation suspension period during which the radiation of microwaves from the radiating device 9 is suspended and the next radiation suspension period is longer when the radiation of microwaves from the radiating device 9 is being performed than when the radiation of microwaves is not being performed. Thus, the frequency of suspending the radiation of microwaves from the radiating device 9 is made lower than in the case where the sampling cycle during the time when the specific condition for performing the radiation is met is set equal to that during the time when the specific condition for performing the radiation is not met. In consequence, as indicated by the solid line L4 in FIG. 5, the rate of rise in the temperature of the filter 8 is higher than that (indicated by broken line L3) in the case where the sampling cycle during the time when the specific condition for performing the radiation is met is set equal to that during the time when the specific condition for performing the radiation is not met. Therefore, a delay in the time when the temperature of the filter 8 reaches the specific PM oxidation temperature can be prevented or reduced.

In the process according to the second modification also, the radiation of microwaves from the radiating device may be stopped before the beginning of the sampling period ds, and the radiation of microwaves from the radiating device 9 may be restarted after the end of the sampling period ds, as in the process according to the above-described first modification.

Third Modification

Figure 6:
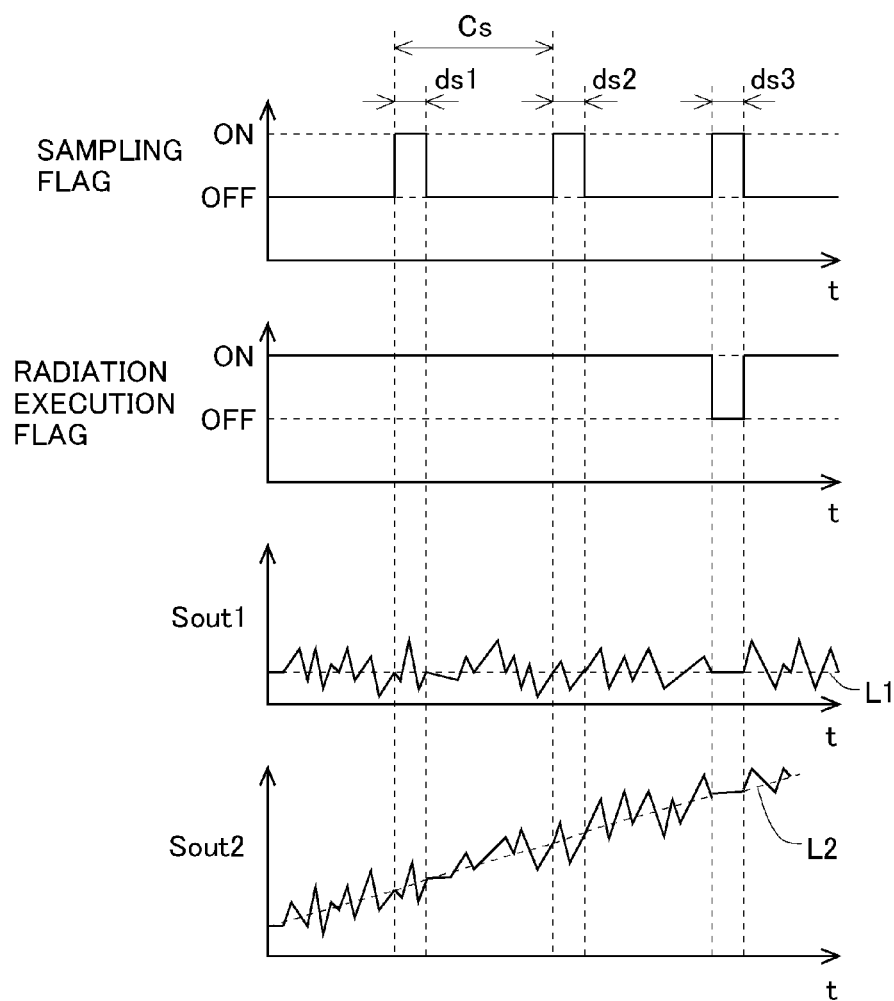
FIG. 6 is a time chart illustrating changes with time of the sampling flag, the radiation execution flag, the output value Sout1 of the first temperature sensor, and the output value Sout2 of the second temperature sensor in a case where the specific condition for performing the radiation is met in a system according to a third modification.

FIG. 6 is a time chart illustrating changes with time of the sampling flag, the radiation execution flag, the output value Sout1 of the first temperature sensor, and the output value Sout2 of the second temperature sensor in a case where the specific condition for performing the radiation is met in the process according to a third modification. In the above-described embodiment, the radiation of microwaves from the radiating device 9 to the filter 8 is suspended during every sampling period, as illustrated in FIG. 2. In the process according to the third embodiment, the radiation of microwaves from the radiating device 9 to the filter 8 is suspended during one of a predetermined number of sampling periods.

FIG. 6 is a time chart in a case where the radiation of microwaves from the radiating device 9 to the filter 8 is suspended during one sampling period ds3 among three sampling periods ds1, ds2, ds3. In this case, the radiation of microwaves from the radiating device 9 to the filter 8 is continued in two sampling periods ds1, ds2 among the three sampling periods. In consequence, fluctuations of the output value Sout1 of the first temperature sensor 13 and the output value Sout2 of the second temperature sensor 14 occur during the two sampling periods ds1, ds2 due to the effect of microwaves. Consequently, there are differences between the output value Sout1 of the first temperature sensor 13 and the actual temperature (L1) of the inflowing exhaust gas and differences between the output value Sout2 of the second temperature sensor 14 and the actual temperature (L2) of the outflowing exhaust gas during the two sampling periods ds1, ds2.

On the other hand, fluctuations of the output values of the first temperature sensor 13 and the second temperature sensor 14 are prevented from occurring during the sampling period ds3 during which the radiation of microwaves from the radiating device 9 to the filter 8 is suspended. In consequence, during that sampling period ds3, the output value of the first temperature sensor 13 indicates the actual temperature (L1) of the inflowing exhaust gas, and the output value of the second temperature sensor 14 indicates the actual temperature (L2) of the outflowing exhaust gas.

In the process of controlling the radiation of microwaves according to this modification, the frequency of suspending the radiation of microwaves from the radiating device 9 is lower than in the case where the radiation of microwaves from the radiating device 9 to the filter 8 is suspended during every sampling period. In consequence, the rate of rise in the temperature of the filter 8 is higher than in the case where the radiation of microwaves from the radiating device 9 to the filter 8 is suspended during every sampling period. Therefore, a delay in the time when the temperature of the filter 8 reaches the specific PM oxidation temperature can be prevented or reduced.

In the process according to this modification, the ECU 10 acquires the output values of the first temperature sensor 13 and the second temperature sensor 14 that are sampled in one sampling period (ds3 in FIG. 6) during which the radiation of microwaves from the radiating device 9 to the filter 8 is suspended among a predetermined number of sampling periods, as measurement values of these sensors 13, 14. Moreover, the ECU 10 estimates the temperature of the filter 8 on the basis of these measurement values. In other words, the output values of the first temperature sensor 13 and the second temperature sensor 14 that are sampled in the sampling periods (ds1 and ds2 in FIG. 6) during which the radiation of microwaves from the radiating device 9 to the filter 8 is continued among the predetermined number of sampling periods are not used by the ECU 10 as measurement values of the inflowing exhaust gas temperature and the outflowing exhaust gas temperature in estimating the temperature of the filter 8.

By the process according to the third modification as above, output values of the first temperature sensor 13 and the second temperature sensor 14 that are not affected by microwaves are acquired as values measured by these sensors 13, 14. Estimating the temperature of the filter 8 on the basis of these values can prevent deterioration in the accuracy of estimation of the temperature of the filter 8.

In the process according to the third modification also, the radiation of microwaves from the radiating device may be stopped before the beginning of the sampling period, and the radiation of microwaves from the radiating device 9 may be restarted after the end of the sampling period, as in the process according to the above-described first modification.

Other Modifications

In the foregoing, we have described cases where microwaves are radiated from the radiating device 9 for the purpose of heating the filter 8. However, the purpose of radiation of microwaves from the radiating device 9 is not limited to heating of the filter 8. For example, the radiating apparatus 9 may be arranged upstream of the oxidation catalyst 7, and the radiation of microwaves from the radiating device 9 may be performed for the purpose of heating the oxidation catalyst 7. In that case also, if microwaves radiated from the radiating device 9 to the oxidation catalyst 7 are incident on the first temperature sensor 13 and/or the second temperature sensor 14, the above-described control of the microwave radiation according to the embodiment or its modifications may be employed.

The purpose of radiation of electromagnetic waves from a radiating device to an exhaust gas purification device according to the present disclosure is not limited to heating of the exhaust gas purification device. For example, some internal combustion engines have a selective catalytic reduction NOx catalyst for reducing NOx in the exhaust gas using ammonia as a reducing agent provided as an exhaust gas purification device in their exhaust passage. The radiating device may be configured to radiate microwaves to such a selective catalytic reduction NOx catalyst for the purpose of estimating the amount of ammonia adsorbed in the selective catalytic reduction NOx catalyst. In that case, if a certain exhaust gas sensor is present within the range of radiation of microwaves from the radiating apparatus, the control of radiation according to the present disclosure may be employed.

What is claimed is:

1. An exhaust gas purification system for an internal combustion engine comprising:
    an exhaust gas purification device provided in an exhaust passage of the internal combustion engine;
    a radiation device provided in the exhaust passage and configured to radiate electromagnetic waves of a specific frequency to the exhaust gas purification device;
    an exhaust gas sensor located within a range of radiation of electromagnetic waves from the radiating device in the exhaust passage; and
    a controller comprising at least one processor configured to perform radiation of microwaves from the radiating device when a specific condition for performing the radiation is met,
    wherein the controller suspends the radiation of electromagnetic waves from the radiating device during a sampling period in which sampling of an output value of the exhaust gas sensor is performed, even while the specific condition for performing the radiation is met.

2. The exhaust gas purification system for the internal combustion engine according to claim 1, wherein the controller stops the radiation of electromagnetic waves from the radiating device before a beginning of the sampling period and restarts the radiation of electromagnetic waves from the radiating device after an end of the sampling period.

3. The exhaust gas purification system for the internal combustion engine according to claim 1, wherein in cases where sampling of the output value of the exhaust gas sensor is performed repeatedly at a predetermined sampling cycle, the predetermined sampling cycle is set longer when the specific condition for performing the radiation is met than when the specific condition for performing the radiation is not met, while the duration of the sampling period is kept the same.

4. The exhaust gas purification system for the internal combustion engine according to claim 1, wherein in cases where sampling of the output value of the exhaust gas sensor is performed repeatedly at a predetermined sampling cycle when the condition for performing the radiation is met, the controller suspends the radiation of electromagnetic waves from the radiating device during one sampling period among a predetermined number of sampling periods.

5. The exhaust gas purification system for the internal combustion engine according to claim 1, wherein the exhaust gas sensor comprises a temperature sensor that measures a temperature of exhaust gas flowing into the exhaust gas purification device or the exhaust gas flowing out of the exhaust gas purification device.

* * * * *